United States Patent
Nishizawa

(10) Patent No.: US 10,235,666 B2
(45) Date of Patent: Mar. 19, 2019

(54) RECEIPT PRODUCTION SYSTEM, PRINTER, AND RECEIPT PRODUCTION METHOD

(71) Applicant: Seiko Epson Corporation, Tokyo (JP)

(72) Inventor: Koji Nishizawa, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 488 days.

(21) Appl. No.: 14/436,771

(22) PCT Filed: Nov. 14, 2013

(86) PCT No.: PCT/JP2013/006687
§ 371 (c)(1),
(2) Date: Apr. 17, 2015

(87) PCT Pub. No.: WO2014/083792
PCT Pub. Date: Jun. 5, 2014

(65) Prior Publication Data
US 2015/0254633 A1   Sep. 10, 2015

(30) Foreign Application Priority Data

Nov. 30, 2012 (JP) .................................. 2012-262114

(51) Int. Cl.
*G06Q 20/20* (2012.01)
*G06Q 20/32* (2012.01)
(Continued)

(52) U.S. Cl.
CPC ..... *G06Q 20/3223* (2013.01); *G06Q 20/0453* (2013.01); *G06Q 20/209* (2013.01); *G07G 5/00* (2013.01)

(58) Field of Classification Search
CPC ........... G06Q 20/32; G06Q 10/00; H04N 1/00
(Continued)

(56) References Cited

U.S. PATENT DOCUMENTS 5,031,098 A * 7/1991 Miller .................. G06Q 20/202
 705/21
7,657,473 B1 * 2/2010 Meffie .................. G06Q 20/042
 235/379

(Continued)

FOREIGN PATENT DOCUMENTS

JP   2000-030154 A   1/2000
JP   2009-151518 A   7/2009
(Continued)

*Primary Examiner* — Oluseye Iwarere
(74) *Attorney, Agent, or Firm* — Nutter McClennen & Fish LLP

(57) ABSTRACT

A printer for outputting receipts enables easily producing receipts for mobile payments.

A receipt production system includes a server that receives payment information; a payment processing terminal including a storage unit that stores server information, a payment unit that executes a payment process and generates payment information including identification information, a transmission unit that sends payment information including the identification information to the server, and an identification information provider unit that transmits the identification information and the server information by wireless communication; a mobile terminal including a terminal communication unit that sends and receives the identification information and the server information transmitted from the payment processing terminal; and a printer including a wireless communication unit that receives identification information and server information transmitted from the mobile terminal by wireless communication, a communication unit that receives payment information including the identification information from the server based on the server information, and a print unit that prints a receipt based on payment information.

9 Claims, 2 Drawing Sheets

(51) Int. Cl.
   *G07G 5/00* (2006.01)
   *G06Q 20/04* (2012.01)

(58) Field of Classification Search
   USPC .............................. 705/24, 44, 32; 358/1.15
   See application file for complete search history.

(56) References Cited

U.S. PATENT DOCUMENTS

| | | | | |
|---|---|---|---|---|
| 8,700,474 B2* | 4/2014 | Argue | ................ | G06Q 20/0453 705/26.1 |
| 8,738,454 B2* | 5/2014 | Argue | ................ | G06Q 20/0453 705/16 |
| 8,831,981 B2* | 9/2014 | Cheng | ................ | H04W 4/008 705/16 |
| 8,843,398 B2* | 9/2014 | Argue | ................ | G06Q 20/3278 705/16 |
| 8,953,195 B2* | 2/2015 | Tsukada | ................ | G06Q 20/209 358/1.13 |
| 9,203,982 B2* | 12/2015 | Yokoyama | ................ | G07G 1/00 |
| 9,292,867 B2* | 3/2016 | Patel | ................ | G06Q 20/0453 |
| 9,443,259 B2* | 9/2016 | Patel | ................ | G06Q 20/0453 |
| 9,509,864 B2* | 11/2016 | Yokoyama | ................ | G07G 1/00 |
| 9,576,283 B2* | 2/2017 | Argue | ................ | G07F 17/42 |
| 9,830,115 B2* | 11/2017 | Sherwood | ................ | G06F 3/08 |
| 2001/0016819 A1* | 8/2001 | Kolls | ................ | G06Q 10/10 705/44 |
| 2003/0004811 A1* | 1/2003 | Omori | ................ | G06Q 20/0453 705/17 |
| 2003/0055784 A1* | 3/2003 | Saruhashi | ................ | G06Q 20/102 705/40 |
| 2003/0095283 A1* | 5/2003 | Nakajima | ................ | H04N 1/00132 358/1.15 |
| 2003/0191700 A1* | 10/2003 | Horne | ................ | G06Q 10/06311 705/32 |
| 2004/0162076 A1* | 8/2004 | Chowdry | ................ | H04L 63/0281 455/445 |
| 2007/0066351 A1* | 3/2007 | Silverbrook | ................ | G06Q 20/14 455/557 |
| 2007/0214094 A1* | 9/2007 | Yokota | ................ | G06Q 20/045 705/77 |
| 2007/0249420 A1* | 10/2007 | Randall | ................ | A63F 13/10 463/40 |
| 2009/0195812 A1* | 8/2009 | Park | ................ | G06F 21/35 358/1.15 |
| 2010/0039666 A1* | 2/2010 | Tsukada | ................ | G06Q 20/209 358/1.15 |
| 2010/0174613 A1* | 7/2010 | Oram | ................ | G06Q 20/20 705/17 |
| 2010/0257067 A1* | 10/2010 | Chan | ................ | G06Q 20/102 705/21 |
| 2011/0125598 A1* | 5/2011 | Shin | ................ | G06Q 10/10 705/17 |
| 2012/0010930 A1* | 1/2012 | Langdon | ................ | G06Q 30/0207 705/14.16 |
| 2012/0185306 A1* | 7/2012 | Cheng | ................ | G06Q 20/209 705/14.4 |
| 2012/0271725 A1* | 10/2012 | Cheng | ................ | H04W 4/008 705/21 |
| 2013/0103461 A1* | 4/2013 | Bhatia | ................ | G06Q 30/0207 705/14.1 |
| 2013/0110607 A1* | 5/2013 | Basmajian | ................ | G06Q 30/0234 705/14.26 |
| 2013/0179299 A1* | 7/2013 | Crutcher | ................ | G06Q 10/083 705/26.8 |
| 2013/0275248 A1* | 10/2013 | Miyashige | ................ | G06Q 40/02 705/24 |
| 2014/0025515 A1* | 1/2014 | Argue | ................ | G06Q 20/0453 705/21 |
| 2014/0025516 A1* | 1/2014 | Argue | ................ | G06Q 20/20 705/21 |
| 2014/0025517 A1* | 1/2014 | Argue | ................ | G06Q 20/3278 705/21 |
| 2014/0032346 A1* | 1/2014 | Hong | ................ | G06Q 20/20 705/18 |
| 2014/0058861 A1* | 2/2014 | Argue | ................ | G07F 17/42 705/18 |
| 2014/0058869 A1* | 2/2014 | Argue | ................ | G06Q 20/0453 705/24 |
| 2014/0068794 A1* | 3/2014 | Aerssens | ................ | A61K 48/005 800/9 |
| 2014/0092415 A1* | 4/2014 | Yokoyama | ................ | G06F 3/1298 358/1.13 |
| 2014/0143075 A1* | 5/2014 | Eason, Jr. | ................ | G06Q 20/322 705/17 |
| 2014/0249905 A1* | 9/2014 | Mehler | ................ | G06Q 20/0453 705/14.23 |
| 2014/0379505 A1* | 12/2014 | Cheng | ................ | H04W 4/008 705/21 |
| 2015/0026065 A1* | 1/2015 | Collins | ................ | G06Q 20/042 705/44 |
| 2015/0112824 A1* | 4/2015 | Tsukada | ................ | G06Q 20/209 705/21 |
| 2015/0138592 A1* | 5/2015 | Yokoyama | ................ | G07G 1/00 358/1.15 |
| 2015/0235195 A1* | 8/2015 | Lee | ................ | G06Q 20/204 705/17 |
| 2015/0254633 A1* | 9/2015 | Nishizawa | ................ | G07G 5/00 705/24 |
| 2015/0262157 A1* | 9/2015 | Chihara | ................ | G07G 1/00 705/21 |
| 2015/0356549 A1* | 12/2015 | Patel | ................ | G06Q 20/0453 705/21 |
| 2016/0050327 A1* | 2/2016 | Yokoyama | ................ | G07G 1/00 358/1.15 |
| 2016/0314516 A1* | 10/2016 | Garrison | ................ | G06Q 30/0635 |
| 2016/0350739 A1* | 12/2016 | Patel | ................ | G06Q 20/0453 |

FOREIGN PATENT DOCUMENTS

| | | |
|---|---|---|
| JP | 2010-146054 A | 7/2010 |
| JP | 2010-157057 A | 7/2010 |

\* cited by examiner

RECEIPT PRODUCTION SYSTEM, PRINTER, AND RECEIPT PRODUCTION METHOD

Priority is claimed under 35 U.S.C. § 119 to Japanese Application No. 2012-262114 filed on Nov. 30, 2012 and under 35 U.S.C. § 365 to PCT/JP2013/006687 filed on Nov. 14, 2013.

TECHNICAL FIELD

The present invention relates to a printer for outputting receipts, and relates more particularly to a printer enabling easy production of receipts when processing mobile payments.

BACKGROUND

Processing payments for product purchases using mobile terminal devices, also known as mobile payments, is becoming increasingly common. In a mobile payment, electronic money, for example, is used; transaction information including payment information and product information is input to a mobile terminal device; and the information is sent on-line or off-line to a server for final processing. After processing, the transaction information is stored on the server. A problem with such mobile payments is issuing a receipt to the payer at the time of payment.

PTL 1 describes transaction information being sent from the server to the customer's mobile phone and displayed after a payment is made at an ECR (Electronic Cash Register) or POS (point of sales) terminal.

PATENT LITERATURE

[PTL 1] JP-A-2010-157057

SUMMARY OF INVENTION

Issuing a receipt for a mobile payment as described above may conceivably use a mobile printer or use an electronic receipt such as disclosed in PTL 1, but battery life is a problem in the former case, and assuring the visibility of the receipt as proof of purchase is difficult in the latter.

An object of the present invention is therefore to provide a printer that is for outputting receipts and is a printer that enables easily producing receipts when processing mobile payments.

Solution to Problem

To achieve the foregoing object, one aspect of the invention is a receipt production system, characterized by: a server that receives payment information; a payment processing terminal including a storage unit that stores server information, a payment unit that executes a payment process and generates payment information including identification information, a transmission unit that sends payment information including the identification information to the server based on the server information stored in the storage unit, and an identification information provider unit that transmits the identification information and the server information by wireless communication; a mobile terminal including a terminal communication unit that sends and receives the identification information and the server information transmitted from the identification information provider unit of the payment processing terminal by wireless communication; and a printer including a wireless communication unit that receives the identification information and the server information transmitted from the terminal communication unit of the mobile terminal by wireless communication, a communication unit that receives payment information including the identification information from the server based on the received server information, and a print unit that prints a receipt based on payment information received by the communication unit.

Because a printer in the receipt production system according to the invention can receive information required to produce a receipt by wireless communication from a mobile terminal, and based on this information the printer itself can acquire the payment information and produce a receipt, a receipt can be easily output for the transaction at a location remote from where the transaction occurred. Application in a mobile payment environment is therefore possible, and the printer can be disposed at a location where the power supply can be assured. Furthermore, because information about the server is received, the printer can access a desired address based on the server information, and the printer can output receipts for transactions that are managed by different sources. Effective use in event halls, flea markets and other venues where there are many stores is therefore possible.

Further preferably in another aspect of the invention, the server information is location information for the server.

Yet further preferably, the printer sends information indicating the receipt was printed to the server when a receipt is printed based on the payment information; and the server stores an indication that a receipt of the payment information was printed.

With this aspect of the invention, once a receipt is produced for a transaction, that the receipt was produced is stored, producing the receipt again can be prevented, and the uniqueness of the receipt as a proof of purchase can be assured.

Yet further preferably in another aspect of the invention, the communication unit of the printer requests the server for transmission of the payment information including the identification information based on the server information when the wireless communication unit receives the identification information and the server information; and the server avoids transmitting the requested payment information when an indication that a receipt was printed is stored for the requested payment information.

To achieve the foregoing object, another aspect of the invention is a printer including: a wireless communication unit that receives identification information identifying a payment process, and information of a server that stores payment information including the identification information; a communication unit that, based on the information of the server received by the wireless communication unit, requests the server for transmission of the payment information including the identification information, and receives payment information including the identification information from the server; and a print unit that prints a receipt based on the payment information including the identification information received by the communication unit.

Yet further preferably in another aspect of the invention, when a receipt is printed by the print unit based on the payment information including the identification information, the communication unit sends information indicating the receipt was printed to the server.

To achieve the foregoing object, another aspect of the invention is a receipt production method including: executing a payment process and generating payment information; adding identification information to the generated payment information and sending the information through a network to a server, and sending information of the server and the identification information by wireless communication to a mobile terminal; a printer acquiring the information of the server and the identification information from the mobile terminal when the mobile terminal to which the information of the server and the identification information were sent communicates by wireless communication with the printer; the printer acquiring payment information that was sent with the added identification information to the server from the server based on the acquired information of the server and the identification information; and printing a receipt based on the acquired payment information.

The receipt production method further preferably includes: sending information to the server indicating that a receipt was printed when the receipt is printed based on the payment information; and when transmission of the payment information for which the information was sent is requested, the server not accepting the request.

Other objects and features of the present invention will become clear from the embodiment of the invention described below.

DETAILED DESCRIPTION

Figure 1:
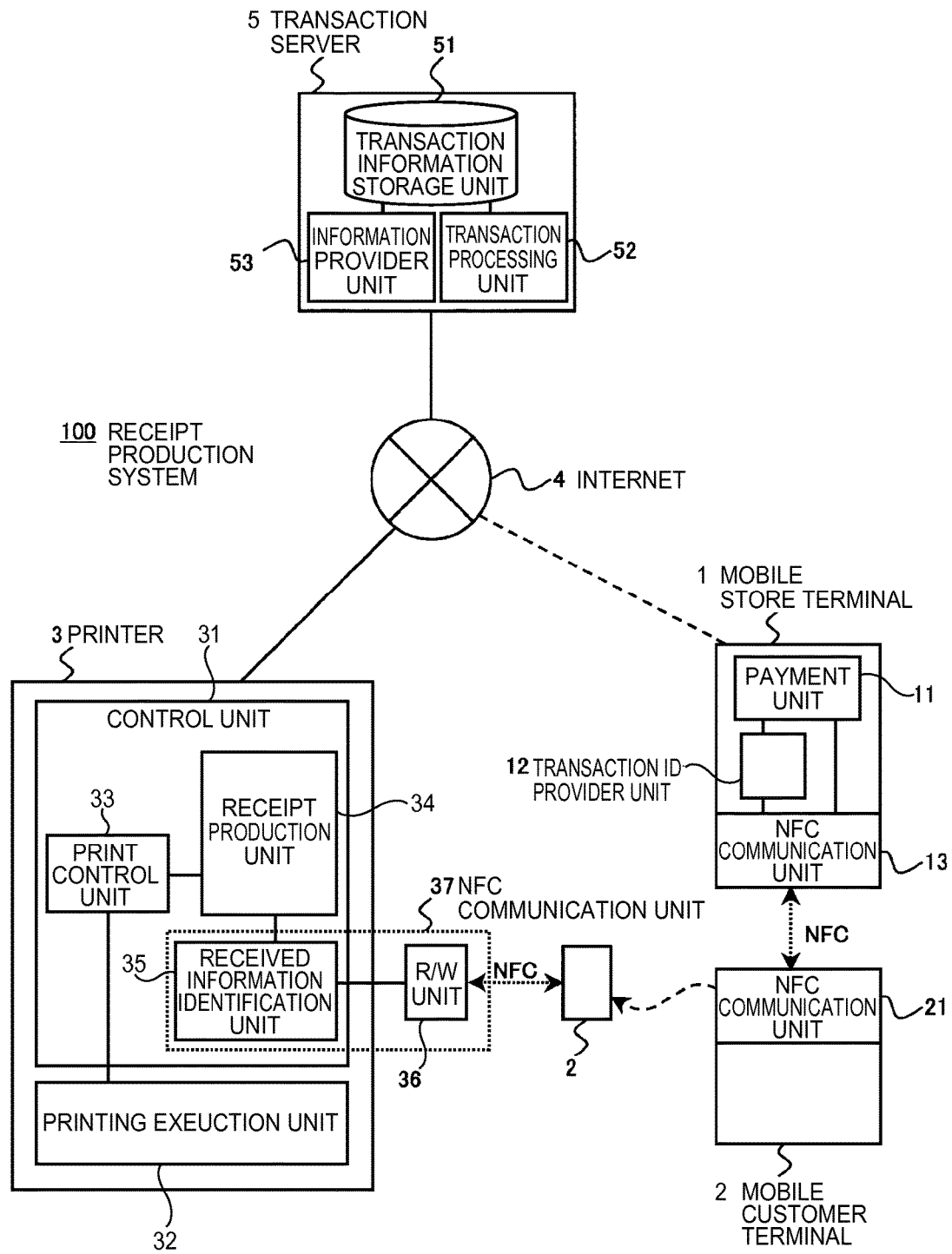
FIG. 1 illustrates the configuration of a printer and a receipt production system according to the invention.

An embodiment of the invention is described below with reference to the accompanying figures. However, the following embodiment does not limit the technical scope of the invention. Note that like or similar elements are identified by the same reference numerals or reference symbols in the figures.

FIG. 1 illustrates the configuration of a printer and receipt production system according to the invention. After a mobile payment is made between a mobile store terminal 1 and a mobile customer terminal 2 in the receipt production system 100 according to this embodiment, receipt production information for producing a receipt is stored by near-field communication in the mobile customer terminal 2. When the customer then takes the mobile customer terminal 2 to where the printer 3 is and swipes the mobile customer terminal 2 over the R/W unit 36, the stored receipt production information is sent by near-field communication to the printer 3. Based on the receipt production information, the printer 3 gets the receipt information (payment information) related to the mobile payment from the transaction server 5 (server) to which the transaction information (payment information) of the mobile payment is sent from the mobile store terminal 1, and outputs a receipt. After output, completion of receipt production is reported to and stored by the transaction server 5. As a result of this process of the receipt production system 100, a unique receipt usable as a proof of purchase can be easily produced even for a mobile payment. Note that near-field communication as used herein refers to short-range wireless communication (NFC: Near-Field Communication) with a communication range of several centimeters to approximately one meter.

This embodiment of the invention anticipates this receipt production system 100 being used in event halls where there are numerous stores or sales stations, flea markets, and large-scale retail stores, for example. A mobile store terminal 1 is employed at each sales station or by individual employees, and there are multiple mobile store terminals 1. The mobile customer terminal 2 is the customer's personal device, and there are multiple mobile customer terminals 2. The printer 3 is installed at a specific location in the same place as the sales station, and there may be one or more printers 3. The transaction server 5 (accessed device) does not need to be located in the same place as the sales station, and is disposed where communication with the mobile store terminal 1 and printer 3 is possible over the Internet 4. There are one or more transaction servers 5 appropriately to the management units of the transactions.

The mobile store terminal 1 (payment processing terminal) is a smartphone or other mobile terminal device used by the seller, has a near-field communication capability, and includes an information processing unit comprising a CPU and memory, for example, a communication unit (transmission unit) that communicates over the Internet 4, a display unit as a user interface, and an operating unit. The functional components mainly related to description of the invention include a payment unit 11, a transaction ID provider unit 12 (identification information provider unit), and a NFC communication unit 13 as shown in FIG. 1.

The payment unit 11 is the part that processes an electronic payment with the mobile customer terminal 2 when there is a transaction with a customer, such as the sale of a product. Identification information for the transaction (a transaction ID, such as transaction date and time information), and identification information for the customer (a customer ID), are generated by this process, and this information is sent to the transaction ID provider unit 12. Information about the transaction, including this identification information, is also sent to the transaction server 5.

The transaction ID provider unit 12 is the part that provides the transaction ID, customer ID, and transaction server 5 location information (URL (Uniform Resource Locator), access address information) as receipt production information to the mobile customer terminal 2. The information is provided by near-field communication through the NFC communication unit 13.

The payment unit 11 and the transaction ID provider unit 12 are embodied by a program describing the above processes, a CPU that operates according to the program, and memory, for example, and the program is preinstalled on the mobile store terminal 1.

The NFC communication unit 13 is the part that handles the near-field communication function, and can be embodied using a common NFC reader/writer (R/W device). More specifically, it includes a CPU, memory, and antenna.

Next, the mobile customer terminal 2 is a mobile terminal device of the customer entering the transaction, and may be a smartphone, for example. The mobile customer terminal 2 has a near-field communication capability, an information processing unit including a CPU and memory, a display unit as a user interface, and an operating unit, for example.

Like the NFC communication unit 13, the NFC communication unit 21 (terminal communication unit) of the mobile customer terminal 2 (mobile terminal) handles near-field communication, and can be embodied using a common NFC reader/writer (R/W device). More specifically, the NFC communication unit 21 includes a CPU, memory, and antenna. During an electronic payment, information is received through the NFC communication unit 21, and the receipt production information is written to the memory of the NFC communication unit 21.

The printer 3 is a printer that outputs a receipt for an electronic transaction, and has a functional configuration such as shown in FIG. 1. The control unit 31 is the part that controls operation of the printer 3, and the printing execution unit 32 (print unit) is the part that executes the printing operation as controlled by the control unit 31.

A print control unit 33 (print unit), receipt production unit 34, and received information identification unit 35 are included in the control unit 31. The print control unit 33 is the part that controls the printing operation, interprets received print commands (print data), and causes the printing execution unit 32 to execute the printing process. The print control unit 33 is a part equivalent to the controller of a typical printer, and includes a CPU, memory, and ASIC, for example.

The receipt production unit 34 (communication unit) is the part that receives the receipt production information from the mobile customer terminal 2, gets the receipt information to produce a receipt from the transaction server 5 based on the receipt production information, and commands producing a receipt based on the receipt information.

The received information identification unit 35 is the part that identifies the data received from the mobile customer terminal 2 through the R/W unit 36, that is, by near-field communication, and executes an identification process based on header information, for example, in the received data. When the received information is identified as receipt production information, the received information identification unit 35 passes the receipt production information to the receipt production unit 34.

The receipt production unit 34 and the received information identification unit 35 include a program describing the receipt process, a CPU that executes processes according to the program, and memory, for example. Note that these control parts may be integrally configured on the same board as the print control unit 33, on a board separate from the print control unit 33 in the printer 3, or as a device externally connected to the printer 3.

Next, the R/W unit 36 is a reader/writer device for near-field communication, and is connected to the printer 3. More specifically, it includes a CPU, memory, and an antenna. The R/W unit 36 reads the receipt production information from the mobile customer terminal 2, and the receipt production information is sent to the received information identification unit 35. Note that the R/W unit 36 may be configured inside the printer 3.

Note that the received information identification unit 35 and R/W unit 36 embody a NFC communication unit 37 (near-field communication unit).

Next, the printing execution unit 32 (print unit) is the part that executes the printing process on media as controlled by the print control unit 33 (print unit), and prints and outputs a receipt.

Next, the transaction server 5 is configured by a common server computer, and while not shown in the figure includes a CPU, RAM, ROM, hard disk drive, display device, input device, and communication interface. As shown in FIG. 1, the functional configuration includes a transaction information storage unit 51, transaction processing unit 52, and information provider unit 53.

The transaction information storage unit 51 is a database that stores information of the transaction (transaction information) performed by the mobile store terminal 1, and is configured with a hard disk drive, for example. The transaction information is stored so that information can be extracted using the transaction ID and customer ID as search keys. Included in the transaction information is information printed on a receipt, such as the name, price, and quantity of the sold product, date and time of sale, sales clerk, and store.

The transaction information storage unit 51 is also configured so that completion of receipt production can also be stored for each transaction.

The transaction processing unit 52 is the part that executes final processing based on the transaction information sent from the mobile store terminal 1, and stores the transaction information sequentially in the transaction information storage unit 51.

The information provider unit 53 is the part that supplies receipt information to the printer 3 in response to a request from the printer 3.

The transaction processing unit 52 and information provider unit 53 include a program describing process content, a CPU that operates according to the program, and RAM, for example.

Figure 2:
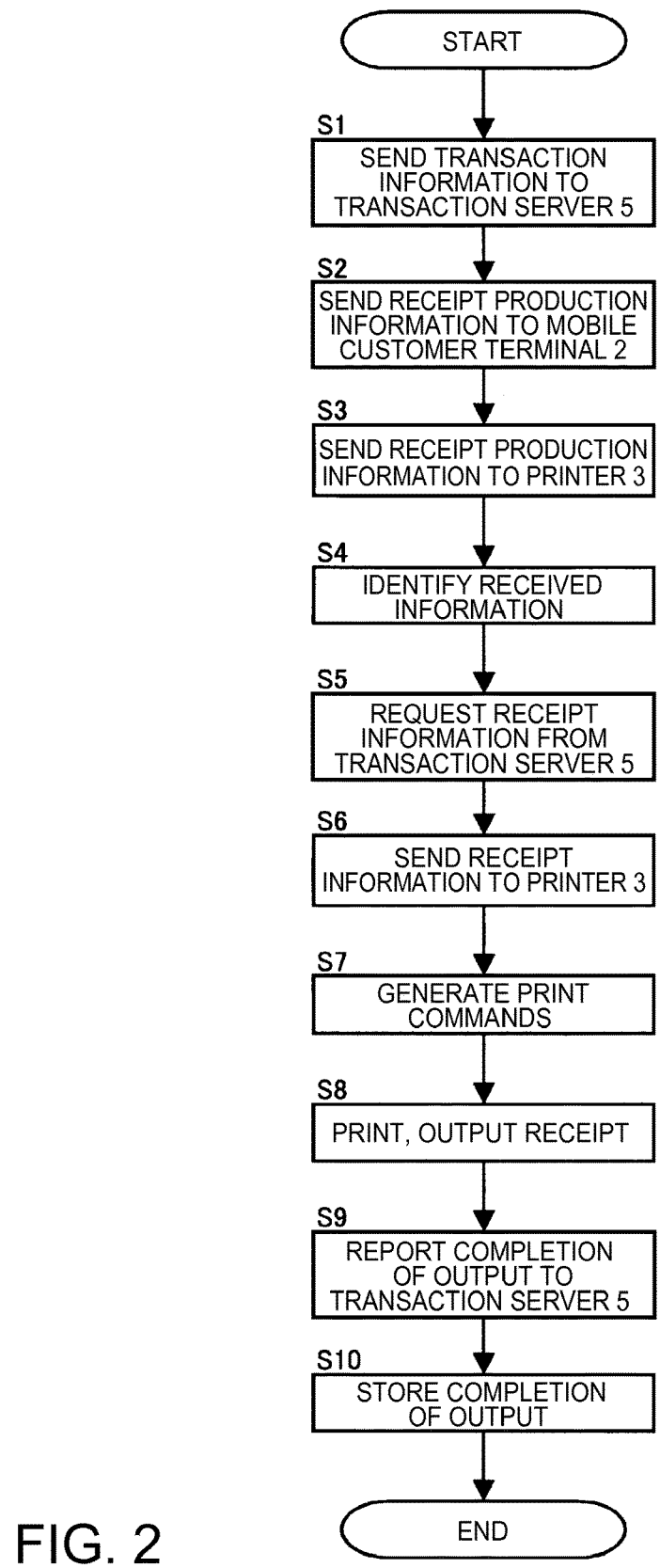
FIG. 2 is a flow chart showing an example of the steps in the receipt production process.

The receipt production system 100 in this embodiment of the invention configured as described above is characterized by the receipt production process following payment for an electronic transaction, and specific steps in the process are described below. FIG. 2 is a flow chart showing an example of steps in the receipt production process. Below, the specific content of the receipt production process that is executed when a mobile payment is made is described based on FIG. 2.

When an electronic transaction is made between the mobile store terminal 1 and the mobile customer terminal 2 by receiving data via near-field communication through the respective NFC communication units 13, 21, the payment unit 11 of the mobile store terminal 1 sends the transaction information for the transaction by communication through the Internet 4 to the transaction server 5 (step S1 in FIG. 2). The transaction ID, customer ID, and information to be printed on the receipt are included in the transaction information.

On the transaction server 5 that received the transmission, the transaction processing unit 52 executes a specific process based on the received transaction information, and stores the transaction information in the transaction information storage unit 51.

The payment unit 11 then passes the receipt production information, that is, the transaction ID, customer ID, and URL of the transaction server 5, to the transaction ID provider unit 12; and the transaction ID provider unit 12 sends the receipt production information through the NFC communication unit 13 by near-field communication to the mobile customer terminal 2 (step S2 in FIG. 2). More specifically, the NFC communication unit 21 of the mobile customer terminal 2 is swiped over the NFC communication unit 13 of the mobile store terminal 1 during the electronic transaction, transmission occurs during this operation, and the receipt production information is written to memory in the NFC communication unit 21.

Note that the operation of swiping the NFC communication unit 21 of the mobile customer terminal 2 over the NFC communication unit 13 of the mobile store terminal 1 may be done when the customer requires outputting a receipt instead of during the electronic transaction operation. In this event, an interface screen for producing a receipt may be displayed on the display device of the mobile store terminal 1 by the transaction ID provider unit 12, and the mobile customer terminal 2 could be swiped after a command operation on the screen. Note that the operation of swiping the NFC communication unit 21 of the mobile customer terminal 2 over the NFC communication unit 13 of the mobile store terminal 1 is an operation of bringing the NFC communication unit 21 within the near-field communication range of the NFC communication unit 13, and the NFC communication unit 21 may be placed in contact with the NFC communication unit 13.

The customer wanting to produce a receipt then goes to where the printer 3 is located, and swipes the NFC communication unit 21 of the mobile customer terminal 2 over the R/W unit 36 of the printer 3. By this operation, the receipt production information written and stored in the NFC communication unit 21 is sent by near-field communication through the R/W unit 36 to the received information identification unit 35 (step S3 in FIG. 2).

The received information identification unit 35 then identifies the transmitted information (step S4 in FIG. 2). The received information identification unit 35 executes an identification process based on the identification information and header information contained in the received information, and based on the result passes the received information to the specific processing unit. Because the received information is the receipt production information in this example, the information is sent to the receipt production unit 34.

When the receipt production information is received, the receipt production unit 34 accesses the transaction server 5 through the Internet 4 based on the URL contained in the received information, and requests the receipt information (step S5 in FIG. 2). More specifically, the receipt production unit 34 sends to the transaction server 5 the transaction ID and customer ID that are contained in the received receipt production information and are identification information for the transaction for which to produce a receipt. Note that communication with the transaction server 5 is handled by a communication function of the printer 3.

The information provider unit 53 of the transaction server 5 that received the request then accesses the transaction information storage unit 51, acquires the information required to print a receipt from the transaction information of the transaction identified by the received transaction ID and customer ID, and sends the acquired information as receipt information to the printer 3 over the Internet 4 (step S6 in FIG. 2). If completion of receipt production has been stored for the identified transaction, the information provider unit 53 returns information indicating the production of the receipt has already been completed to the printer 3, and does not send the receipt information. However, if completion of receipt production has not been stored for the identified transaction, the information provider unit 53 sends the receipt information. The receipt information is still not written as print commands for the printer 3, and is expressed in the format of a common print request that is passed to a printer driver.

Next, when the printer 3 receives the receipt information, the receipt production unit 34 generates print commands for printing a receipt of the transaction based on the receipt information (step S7 in FIG. 2). More specifically, it executes the process of a printer driver normally disposed to the host device.

Note that when information indicating the receipt has already been produced is received from the transaction server 5, the receipt production unit 34 reports to the user of the printer 3 that the receipt has already been produced, does not generate print commands, and therefore does not produce a receipt.

The generated print commands are sent from the receipt production unit 34 as print instructions to the print control unit 33, the printing execution unit 32 prints a receipt based on the print commands as controlled by the print control unit 33, and a receipt is output (step S8 in FIG. 2). The output receipt is then passed to the customer.

When receipt output thus ends, the receipt production unit 34 sends a report of completed output to the transaction server 5 (step S9 in FIG. 2). The transaction ID and customer ID are contained in this report to identify the transaction for which receipt production is completed.

The information provider unit 53 of the transaction server 5 that received the report then accesses the transaction information storage unit 51, and stores an indication that production of a receipt has been completed for the transaction identified by the received transaction ID and customer ID (step S10 in FIG. 2).

A receipt output process is thus completed when a transaction is made in a mobile payment environment.

Note that both the transaction ID, which is information about the transaction date and time, and a customer ID, which identifies a customer, are both used as identification information to identify a transaction, but if the transaction ID is identification information that can identify a single transaction, the customer ID may not be used.

Furthermore, receipt uniqueness is assured by storing an indication in the transaction server 5 that a receipt was produced for transactions for which a receipt has been produced, but receipt uniqueness may be assured by deleting the receipt production information for transactions for which a receipt has been produced from the mobile customer terminal 2, or recording that production is completed in the receipt production information stored in the mobile customer terminal 2 for a transaction for which a receipt was produced. In this event, the customer is requested to swipe the NFC communication unit 21 of the mobile customer terminal 2 over the R/W unit 36 of the printer 3 again after outputting a receipt, and this process is executed on the memory of the NFC communication unit 21 by near-field communication with the receipt production unit 34 during this swiping operation.

As described above, because the printer 3 according to this embodiment receives receipt production information using near-field communication, and the printer 3 acquires receipt information from the transaction server 5 based on the receipt production information and produces a receipt, a receipt for the transaction can be output easily at a location remote from where the transaction occurred as long as the device providing the receipt production information has mobility. Application in a mobile payment environment is therefore possible, and the printer can be installed where the power supply is assured.

Because the URL of the transaction server 5 is also included in the receipt production information, the printer 3 can access a desired transaction server based on the URL, and receipts can be output by the printer 3 for transactions managed by different sources. Effective application is therefore possible in flea markets, event halls, and other locations where there are multiple stores.

Furthermore, because completion of receipt production is stored for transactions for which a receipt has once been produced, producing a receipt again can be prevented, and the uniqueness of receipts as proof of purchase can be assured.

Furthermore, because print commands for receipts are generated on the printer 3 side, there is no need for a driver for the printer 3 on the transaction server 5, and associated set-up is not required.

Furthermore, outputting a paper receipt instead of an electronic receipt can be done easily in mobile payments.

The scope of the present invention is not limited to the embodiment described above, and includes the invention described in the following claims and equivalents thereof.

INDUSTRIAL APPLICABILITY

As described above, the present invention is useful in a printer that is used in a POS system and prints receipts, and can be applied to printing devices that print receipts and are used in a POS system that uses mobile terminals.

REFERENCE SIGNS LIST 1 mobile store terminal
2 mobile customer terminal
3 printer
4 Internet
5 transaction server
11 payment unit
12 transaction ID provider unit
13 NFC communication unit
21 NFC communication unit
31 control unit
32 printing execution unit
33 print control unit
34 receipt production unit
35 received information identification unit
36 R/W unit
37 NFC communication unit
51 transaction information storage unit
52 transaction processing unit
53 information provider unit
100 receipt production system

The invention claimed is:

1. A receipt production system, comprising:
a server;
a payment processing terminal;
a mobile terminal; and
a printer;
wherein the payment processing terminal includes a storage unit that stores location information for the server, a payment unit that executes a payment process and generates payment information including identification information associated with the payment information, a transmission unit that sends the payment information and the identification information to the server for storage, and an identification information provider unit that transmits the identification information and the location information of the server by wireless communication to the mobile terminal;
wherein the mobile terminal includes a terminal communication unit that sends the identification information associated with the payment information and the location information of the server to the printer; and
wherein the printer includes a wireless communication unit that receives the identification information associated with the payment information and the location information of the server from the terminal communication unit of the mobile terminal by wireless communication, a communication unit that sends a request for transmission of the payment information to the server using the identification information and the location information of the server acquired from the mobile terminal and that receives the payment information associated with the identification information from the server in response to sending the request, and a print unit that prints a receipt based on the payment information received by the communication unit.

2. The receipt production system of claim 1, wherein:
the printer sends information indicating the receipt was printed to the server when the receipt is printed based on the payment information; and
the server stores an indication that a receipt of the payment information was printed.

3. The receipt production system of claim 2, wherein the server avoids transmitting the requested payment information when the indication that the receipt was printed is stored for the requested payment information.

4. A printer, comprising:
a wireless communication unit that receives identification information associated with payment information and location information of a server that stores the payment information and the identification information from a mobile terminal;
a communication unit that sends a request to the server for transmission of the payment information using the identification information and the location information of the server acquired from the mobile terminal and that receives the payment information associated with the identification information from the server in response to sending the request; and
a print unit that prints a receipt based on the payment information received by the communication unit,
when a receipt is printed by the print unit based on the payment information including the identification information, the communication unit sends information indicating the receipt was printed to the server, and
wherein the print unit does not print a receipt which has once been printed by the print unit.

5. A receipt production method comprising:
executing, by a payment processing terminal, a payment process and generating payment information;
adding, by the payment processing terminal, identification information to the payment information and sending the payment information and the identification information through a network to a server for storage;
sending, by the payment processing terminal, location information of the server and the identification information associated with the payment information by wireless communication to a mobile terminal;
acquiring, by a printer, the location information of the server and the identification information associated with the payment information from the mobile terminal when the mobile terminal to which the location information of the server and the identification information were sent communicates by wireless communication with the printer;
sending, by the printer, a request for transmission of the payment information to the server using the identification information and the location information of the server acquired from the mobile terminal;
acquiring, by the printer, the payment information associated with the identification information from the server in response to sending the request; and
printing, by the printer, a receipt based on the acquired payment information.

6. The receipt production method of claim 5, further comprising:
sending, by the printer, information to the server indicating that the receipt was printed when the receipt is printed based on the payment information; and
avoiding, by the server, transmission of the requested payment information in response to receiving the information indicating that the receipt was printed.

7. The receipt production method of claim 5, wherein:
sending, by the printer, information indicating that the receipt was printed to the server when the receipt is printed based on the payment information; and
the server stores an indication that the receipt of the payment information was printed.

8. The receipt production method of claim 6, further comprising:
reporting, by the printer, that the receipt was printed when information indicating the receipt was printed is received from the server in response to sending the request.

9. The receipt production system of claim 2, wherein the printer reports that the receipt was printed when information indicating the receipt was printed is received from the server in response to sending the request.

* * * * *